United States Patent
Hineno (10) Patent No.: US 6,795,254 B2
(45) Date of Patent: Sep. 21, 2004

(54) OBJECTIVE LENS FOR OPTICAL PICKUP AND OPTICAL PICKUP EMPLOYING THIS OBJECTIVE LENS

(75) Inventor: Satoshi Hineno, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 10/362,515

(22) PCT Filed: Jun. 21, 2002

(86) PCT No.: PCT/JP02/06246
§ 371 (c)(1),
(2), (4) Date: Feb. 24, 2003

(87) PCT Pub. No.: WO03/001270
PCT Pub. Date: Jan. 3, 2003

(65) Prior Publication Data
US 2004/0001261 A1 Jan. 1, 2004

(51) Int. Cl.$^7$ .............................................. G02B 13/18
(52) U.S. Cl. .................. 359/719; 359/661; 369/112.23
(58) Field of Search ................................ 359/719, 661; 369/112.23

(56) References Cited

U.S. PATENT DOCUMENTS

2003/0174416 A1 * 9/2003 Takahashi et al. .......... 359/719

FOREIGN PATENT DOCUMENTS

| EP | 0 776 004 A2 | 5/1997 |
|---|---|---|
| EP | 1 081 692 A2 | 3/2001 |
| JP | 61-179409 | 8/1986 |
| JP | 62-227112 | 6/1987 |
| JP | 1-109316 | 4/1989 |
| JP | 1-77006 | 7/1989 |
| JP | 1-276107 | 11/1989 |
| JP | 2-106709 | 4/1990 |
| JP | 9-185836 | 7/1997 |
| JP | 10-221595 | 8/1998 |
| JP | 2001-324673 | 11/2001 |
| JP | 2002-140831 | 5/2002 |

* cited by examiner

Primary Examiner—Scott J. Sugarman
(74) Attorney, Agent, or Firm—Rader, Fishman & Grauer PLLC; Ronald P. Kananen (57) ABSTRACT

The present invention is concerned with an objective lens for an optical pickup, which is made up by a single lens of a meniscus structure, and which includes, looking sequentially from a light source side, a first surface $S_1$ formed by an aspherical surface, having a positive refractive power, and a second surface $S_2$, formed by an aspherical surface, having a negative refractive power, with the numerical aperture (NA) of the lens being not less than 0.8.

The aspherical shape $Z_i$ of the aspherical surfaces of the first and second surfaces is given by the equation:

$$Z_i = \frac{r_i^{-1} h^2}{1 + \sqrt{1 - (1+k_i) r_i^{-2} h^2}} + A_i h^4 + B_i h^6 +$$
$$C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients. In addition, the following condition:

$$(r_1/r_2) \leq (2N^2 - N - 4)/\{N(2N+1)\}$$

is to be met, where r1 is the radius of curvature of the first surface, $r_2$ is the radius of curvature of the second surface and N is a refractive index of the vitreous material.

11 Claims, 11 Drawing Sheets

OBJECTIVE LENS FOR OPTICAL PICKUP AND OPTICAL PICKUP EMPLOYING THIS OBJECTIVE LENS

TECHNICAL FIELD

This invention relates to an objective lens for an optical pickup, employed for irradiating the laser light as a light beam on a signal recording surface of a disc-shaped recording medium, that is an optical disc, the optical pickup employing this objective lens, and to an optical disc device.

BACKGROUND ART

An optical disc is now in use as an information recording medium, specifically, a recording medium which allows to record and/or reproduce the information without a recording and/or reproducing head contacting with the recording medium, and in which it is attempted to increase the recording density. The information recorded on this optical disc may be read and reproduced by irradiating the laser light radiated from the optical pickup as a recording and/or reproducing head to a signal recording layer of the optical disc, and by detecting the laser light reflected by the signal recording layer by a photodetector provided in the optical pickup.

Among the optical discs capable of recording and/or reproducing the information, there is an optical disc that employs a phase change recording layer which is changed from a crystallized state to a non-crystallized state and vice versa on irradiation of, for example, the laser light thereon. The information recording for this sort of the optical disc is by irradiating the signal recording layer with the laser light modulated in accordance with the information signals for recording.

As is typical of an optical disc that employs the phase change recording layer to allow for information recording and/or reproduction, there is a DVD (Digital Video Disc or Digital Versatile Disc). The DVD is improved appreciably in recording density as compared to CD which is the optical disc now finding widespread use. The track pitch of the recording track of the DVD is 0.74 m, in comparison with 1.6 m in the case of the CD, thus achieving high recording density.

For irradiating the laser light on the optical disc to allow high density information recording, it is necessary to form a beam spot of yet a smaller size on a signal recording surface of the optical disc. Since the spot diameter of the laser light is proportionate to the design wavelength of the laser light and inversely proportionate to the numerical aperture (NA) of the objective lens converging the laser light, it is necessary to increase the numerical aperture of the objective lens and to diminish the wavelength of the laser light if high recording density of the laser light is to be achieved.

For further improving the recording density of the optical disc, such an optical pickup has been proposed in which the wavelength of the laser light used for recording and/or reproducing the information is 405 nm and in which the numerical aperture (NA) of the objective lens is 0.85 and approximately 1.5 when ultra-resolution is not used, when ultra-resolution is used, and when the lens used is a so-called solid immersion lens, abbreviated to SIL, respectively.

As a technique for increasing the numerical aperture (NA) of the objective lens for achieving high recording density of the optical disc, a double lens type objective lens, typified by SIL, has been proposed. In the SIL, exploiting light bleedout in an objective lens with the numerical aperture (NA) not less than 1, the working distance (WD), that is a distance between the foremost part of the objective lens and the signal recording layer of the laser light, as a light collecting point, is on the order of tens of nm.

Figure 1:
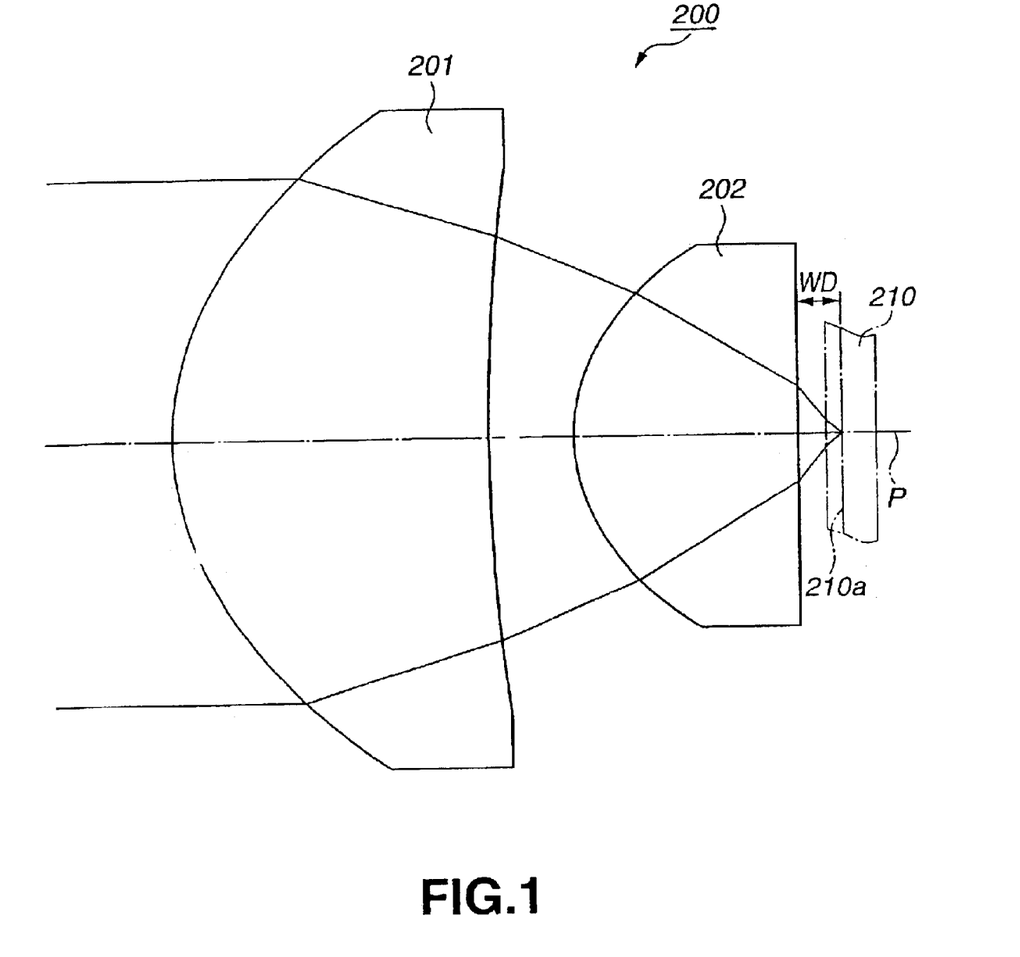
FIG. 1 is a longitudinal cross-sectional view showing a structure of a conventional objective lens.

As an objective lens, in which the numerical aperture (NA) is increased without resorting to SIL, the objective lens shown in Japanese Laying-Open Patent Publication H-10-104507, and the objective lens shown in FIG. 1 hereof, have so far been proposed. In these objective lenses, shown in the above Patent Publication or in FIG. 1 hereof, a double-lens structure, similar to that used in the SIL, is used. With this lens structure, it is targeted to scatter the power between the two lenses to relieve the load of the refractive power imposed on the respective surfaces. This lens structure is meritorious in the perspective of lens machining because the radius of curvature of each lens surface may be moderated, and also because the aspherical coefficient may be diminished.

However, with the objective lens 200, shown in FIG. 1, a first lens 201 and a second lens 202 are arranged along the direction of an optical axis P to distribute the refractive power between the first and second lenses 201, 202. Thus, the principal point is intruded into the inside of the objective lens 200, with the result that the WD up to a signal recording surface 210*a* of the optical disc 105 is diminished. Meanwhile, the WD of the objective lens 200 shown in FIG. 1 is 0.15 mm.

Although the numerical aperture (NA) of the objective lens 200 as shown in FIG. 1, designed as described above, may be increased, the WD is small, so that, when the objective lens is built into the optical pickup for recording and/or reproducing the optical disc, the objective lens collides against the optical disc. Specifically, such collision of the objective lens against the optical disc unavoidably occurs due to deviation of the surface of the rotationally driven optical disc from planarity or to movement of the objective lens along the optical axis in the course of focussing control of the laser light.

With the objective lens, shown in FIG. 1, the beam diameter of the laser light just emanated from the objective lens is extremely small, so that, even if small-sized dust and dirt become attached to the laser light radiating surface of the objective lens or to the laser light incident surface of the optical disc, the laser light cannot be converged with a sufficient light volume on the signal recording surface of the optical disc.

In the case of the objective lens, combined from two lenses, it is required to maintain a highly accurate distance between the forward and rear lenses and to assemble the lenses without producing offset or tilt to render production and assembling extremely difficult. With the objective lens 200, shown in FIG. 1, it is required to suppress distance errors between the first and second lenses 201, 202 to 5 m or less, as well as to suppress the tilt between the lenses 201, 202 to 1 mrad or less.

In order to solve the problem proper to the double type objective lens unit, a demand is raised for a single type lens unit, as an objective lens for an optical pickup, in which it is possible to increase the WD and in which there is no necessity for combining plural lenses.

With the single type objective lens unit, so far proposed or put to practical use, if the numerical aperture (NA) is increased, the first surface of the lens, as a laser light incident surface, has a depth (sag) which is increased as compared to the basic curvature, thus presenting difficulties in machining employing a metal die device for molding.

DISCLOSURE OF THE INVENTION

In view of the above-depicted status of the art, it is an object of the present invention to provide a novel objective lens usable with advantage with an optical pickup, used for recording and/or reproducing the information for an optical recording medium, the recording density of which has been raised by narrowing the track pitch of the recording track. It is a more specific object of the present invention to provide an objective lens for an optical pickup that is able to converge the laser light to close to the diffraction limit.

It is also a specific object of the present invention to provide an optical pickup employing an objective lens capable of converging the laser light to close to the diffraction limit, and an optical disc device employing this optical pickup.

It is a further specific object of the present invention to provide an objective lens for an optical pickup which may be readily machined using a metal die for molding.

For accomplishing the above object, the present invention provides an objective lens for an optical pickup, made up by a single lens of a meniscus structure including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of the aspherical surfaces of the first and second surfaces is given by the equation:

$$Z_i = \frac{r_i^{-1} h^2}{1 + \sqrt{1 - (1+k_i) r_i^{-2} h^2}} + A_i h^4 + B_i h^6 +$$
$$C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients.

Moreover, the following condition:

$$(r_1/r_2) \leq (2N^2 - N - 4)/\{N(2N+1)\}$$

is met, where $r_1$ is the radius of curvature of the first surface, $r_2$ is the radius of curvature of the second surface and N is a refractive index of the vitreous material.

In addition, with an objective lens for an optical pickup according to the present invention, the following condition:

$$r_1 < f \cdot NA$$

is met, where $r_1$ is the radius of curvature of the first surface, f is the focal length and the NA is the numerical aperture.

The present invention also provides an objective lens for an optical pickup, made up by a single lens of a meniscus structure including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of the aspherical surfaces of the first and second surfaces is given by the equation:

$$Z_i = \frac{r_i^{-1} h^2}{1 + \sqrt{1 - (1+k_i) r_i^{-2} h^2}} + A_i h^4 + B_i h^6 +$$
$$C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients.

Moreover, the following condition:

$$r_1 < f \cdot NA$$

is also met, where $r_1$ is the radius of curvature of the first surface, f is the focal length and the NA is the numerical aperture.

The objective lens for the optical pickup according to the present invention is formed of a vitreous material having a refractive index of not less than 1.7.

The present invention also provides an optical pickup including a light source radiating a laser light beam, a beam splitter, an objective lens for converging the laser light on a signal recording surface of a disc-shaped recording medium, and a light receiving element for receiving the laser light reflected back from the signal recording surface of the disc-shaped recording medium. The objective lens for this optical pickup includes, looking sequentially from a light source side, a first surface formed by an aspherical surface, having a positive refractive power, and a second surface, formed by an aspherical surface, having a negative refractive power, with the numerical aperture (NA) of the lens being not less than 0.8. The aspherical shape $Z_i$ of the aspherical surfaces of the first and second surfaces is given by the equation:

$$Z_i = \frac{r_i^{-1} h^2}{1 + \sqrt{1 - (1+k_i) r_i^{-2} h^2}} + A_i h^4 + B_i h^6 +$$
$$C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients. In addition, the following condition:

$$(r_1/r_2) \leq (2N^2 - N - 4)/\{N(2N+1)\}$$

is met, where $r_1$ is the radius of curvature of the first surface, $r_2$ is the radius of curvature of the second surface and N is a refractive index of the vitreous material.

With the objective pickup the following condition:

$$r_1 < f \cdot NA$$

is also met, where $r_1$ is the radius of curvature of the first surface, f is the focal length and the NA is the numerical aperture.

The present invention also provides an optical pickup including a light source radiating a laser light beam, a beam splitter, an objective lens for converging the laser light on a signal recording surface of a disc-shaped recording medium, and a light receiving element for receiving the laser light reflected back from the signal recording surface of the disc-shaped recording medium. The objective lens for the optical pickup includes, looking sequentially from a light source side, a first surface formed by an aspherical surface, having a positive refractive power, and a second surface, formed by an aspherical surface, having a negative refractive power, with the numerical aperture (NA) of the lens being not less than 0.8. The aspherical shape of the aspherical surfaces of the first and second surfaces is given by the equation:

$$Z_i = \frac{r_i^{-1}h^2}{1+\sqrt{1-(1+k_i)r_i^{-2}h^2}} + A_ih^4 + B_ih^6 + C_ih^8 + D_ih^{10} + E_ih^{12} + F_ih^{14} + G_ih^{16} + H_ih^{18} + J_ih^{20}$$

with the height from the optical axis being h, where i is the surface number, as counted from the light source side, r is the radius of curvature of the aspherical surface, k is the cone constant, with k<0, and A to J denote aspherical coefficients. In addition, the following condition:

$$r_1 < f \cdot NA$$

is met, where $r_1$ is the radius of curvature of the first surface, f is the focal length and the NA is the numerical aperture.

The present invention also provides an optical disc apparatus including a rotational driving mechanism for rotationally driving a disc-shaped optical recording medium, and an optical pickup movable along the radius of the disc-shaped optical recording medium, run in rotation by the rotational driving mechanism, and adapted for scanning a signal recording area of the disc-shaped optical recording medium by laser light radiated from a light source to record and/or reproduce the information. This optical disc apparatus uses any of the above optical pickups as its optical pickup. Other objects, features and advantages of the present invention will become more apparent from reading the embodiments of the present invention as shown in the drawings.

BEST MODE FOR CARRYING OUT THE INVENTION

Referring to the drawings, an objective lens for an optical pickup, and an optical pickup, employing this objective lens, and an optical disc device, are now explained in detail.

In the embodiments of the present invention, now explained, the present invention is applied to an optical disc device of a standard for recording and/or reproducing information signals for a disc-shaped recording medium, in which the information recording density is raised by narrowing the track pitch having a track pitch on the order of 0.6 m, which is narrower than the track pitch of the recording track of a Compact Disc (CD) as a disc-shaped recording medium, such as, for example, the DVD (Digital Video Disc/Digital Versatile Disc).

First, an optical disc device employing an optical pickup employing, in turn, an objective lens according to the present invention, is explained.

An optical disc driving device 1, according to the present invention, is configured for reading in recording signals, recorded with a large rpm, at an elevated velocity, and for writing information signals, equally at an elevated velocity, and is used as an optical recording medium having an extremely fine track pitch and hence a high recording capacity, or as an external storage device for an information processing apparatus, such as a personal computer.

Figure 2:
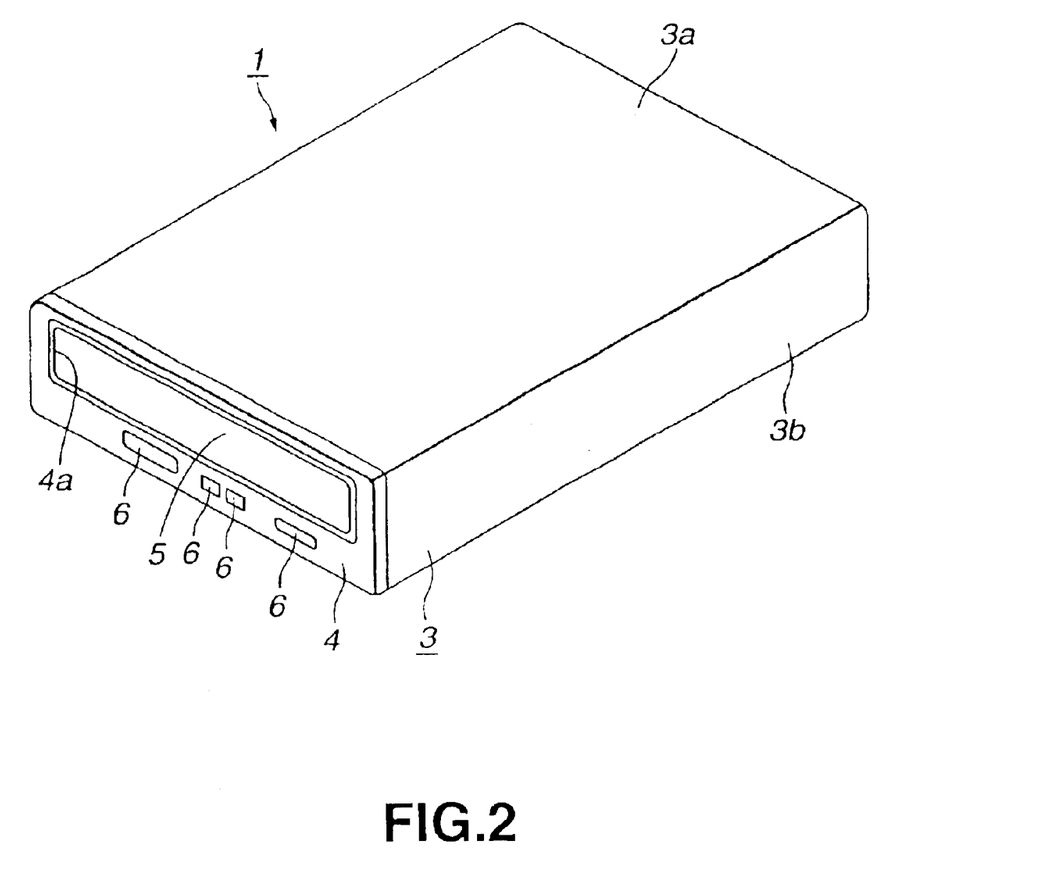
FIG. 2 is a schematic perspective view showing the appearance of an optical disc device according to the present invention.
Figure 3:
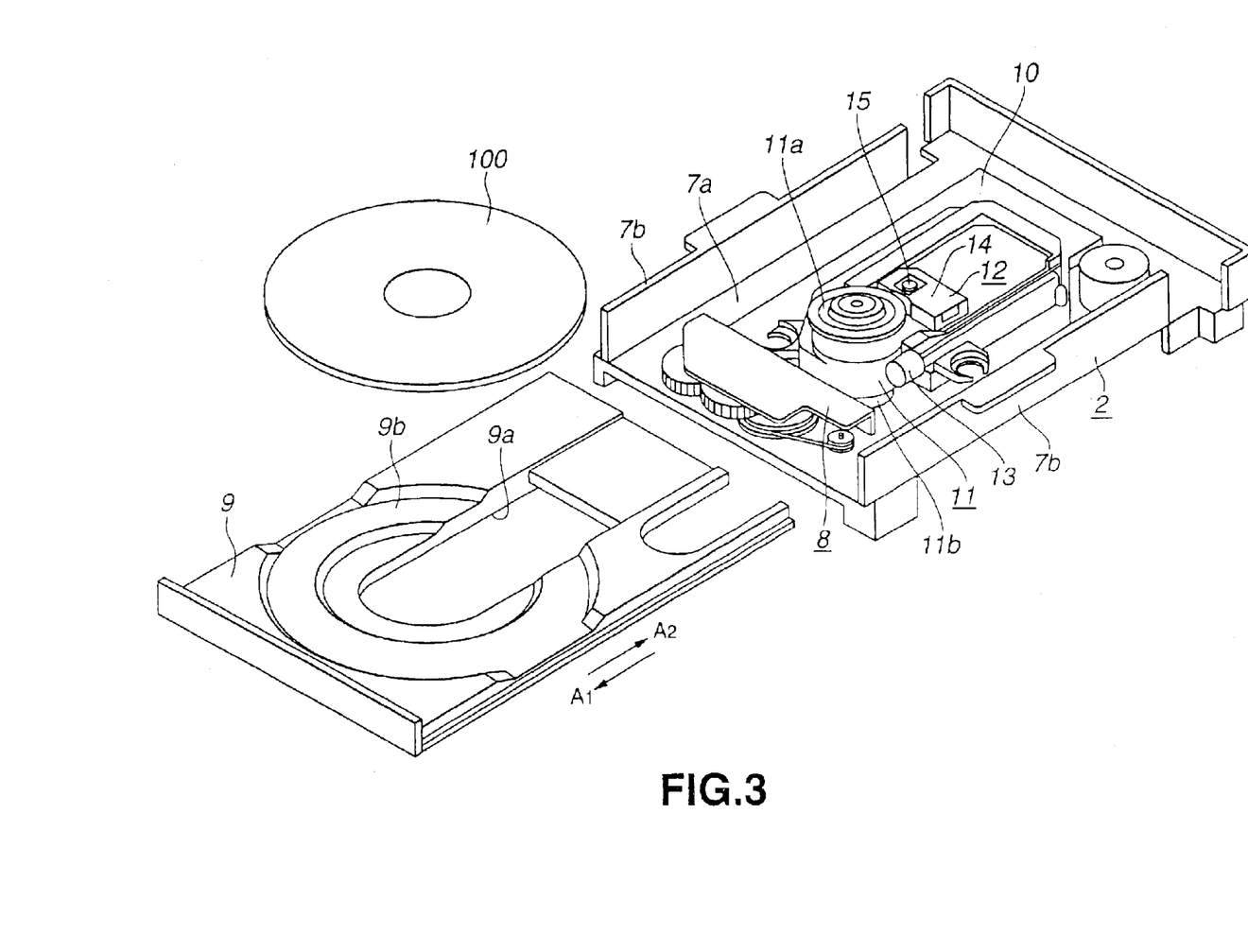
FIG. 3 is an exploded perspective view showing an inner structure of an optical disc device.

Referring to FIGS. 2 and 3, the optical disc driving device 1 includes a mechanical frame 2, having various mechanical units arranged thereon. The upper, left, right, forward and rear portions of the mechanical frame 2 are covered up by a cover member 3 and a front panel 4, secured thereto by suitable means, such as set screws.

The cover member 3 is integrally formed by a top plate 3a, side surface portions 3b, 3b, depending from both side edges of the top plate 3a, and a back surface portion, not visible in the drawing. The front panel 4 includes a horizontally elongated opening 4a and a door 5 for opening/closing the opening 4a is rotatably mounted to the front panel 4 with its upper edge portion as a hinge. The front panel 4 includes plural operating buttons 6 for carrying out various operations.

The mechanical frame includes a mounting surface 7a for mounting various mechanical units, and side edge portions 7b, 7b upstanding from both side edge portions of the mounting surface 7a. On the front end of the mounting surface 7a is mounted a loading mechanism 8 including e.g., cam plates or gearing, not shown.

Referring to FIG. 3, a disc tray 9 is carried by the mechanical frame for movement in the fore-and-aft direction as indicated by arrows A1 and A2 in FIG. 3. The disc tray 9 is formed with an insertion through-hole 9a, elongated in the fore-and-aft direction, and a disc setting recess 9b in which to set a disc-shaped optical recording medium, referred to below as optical disc 100. When the optical disc 100 is set in the disc setting recess 9b, the disc tray 9 is moved by the loading mechanism 8 so as to be protruded to outside the main body unit of the device, whereas, in recording and/or reproducing the information for the optical disc 100, the disc tray 9 is pulled into the inside of the main body unit of the device as the optical disc 100 is set in the disc setting recess 9b.

Referring to FIG. 3, a movement frame 10 is carried by the mounting surface 7a of the mechanical frame for rotation with its rear end portion as a hinge.

The movement frame 10 includes a motor unit 11 configured for rotational driving the optical disc 100. The motor unit 11 includes a disc table 11a and a driving motor 11b. On the movement frame 10 is mounted an optical pickup 12 for movement in the radial direction of the optical disc 100 loaded on the disc table 11a by a guide screw, not shown, and by a lead screw, also not shown.

On the movement frame 10 are mounted a feed motor 13 for rotational driving the lead screw. Thus, when the lead screw is rotated by the feed motor 13, the optical pickup is moved in the direction corresponding to the direction of rotation, as the optical pickup 12 is guided by its guide shaft.

In the optical disc driving device 1, according to the present invention, the optical disc 100 is pulled into the inside of the apparatus, as the disc is set in the disc setting recess 9b of the disc tray 9, so as to be held by any suitable means on the disc table 11a. When the optical disc 100 is run in rotation, along with the disc table 11a, under driving by the driving motor 11b of the motor unit 11, the information is recorded and/or reproduced on or from the optical disc 100, as the optical pickup 12 is moved along the radius of the optical disc 100.

The structure of the optical pickup 12, recording and/or reproducing the information on or from the optical disc 100, is hereinafter explained.

Figure 4:
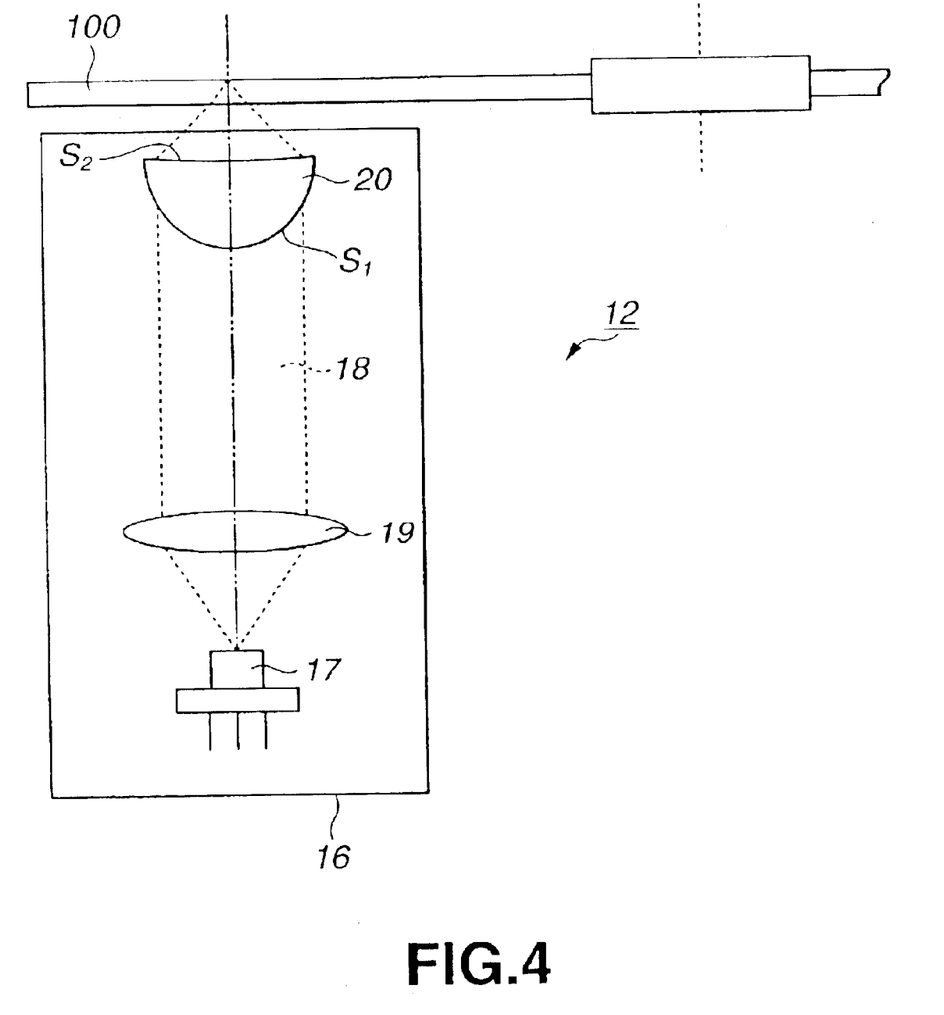
FIG. 4 is a side view showing an optical pickup according to the present invention.

Referring to FIG. 4, the optical pickup 12 is carried for movement radially of the optical disc 100, as shown in FIG. 4, and includes a bi-axial actuator, not shown, carried by a housing 16. Within the housing 16, there are mounted a laser light radiating device 17 for generating the laser light, and a collimator lens 19, for turning a laser light beam 18, radiated from the laser light radiating device 17 into a parallel beam. An objective lens 20, embodying the present invention, adapted for converging the laser light beam 18 on the recording layer of the optical disc 100, is carried by a bi-axial actuator, not shown.

The optical disc 100 has a substrate of a reduced thickness, with the narrow track pitch on the order of 0.3 m, and is of a standard complying with the high density recording. The optical pickup 12 is designed to record and/or reproduce the information on or from such optical disc 100. Consequently, the laser light radiating device 17 is configured for generating the laser light beam 18, with a wavelength on the order of 400 nm to 410 nm, which is shorter than the wavelength of 780 nm of the laser light of the conventional CD standard. By superposing the high frequency current on the driving current for reducing the laser noise, the wavelength of the laser light 18 is varied with a shorter period.

In recording a recording layer of the optical disc 100, the laser light beam 18 of a high energy output is radiated from the laser light radiating device 17. The laser light beam 18 is turned into a parallel beam by the collimator lens 19 and converged on the recording layer of the optical disc 100 by the objective lens 20 to form pits having recorded the information by, e.g., phase change.

In reading out the recorded information, the laser light beam 18 of a lower energy output than in recording the information is irradiated on the recording layer of the optical disc 100. The laser light beam 18, reflected from the optical disc 100, is detected by a light receiving system, including a beam splitter, not shown, provided in the optical pickup 12.

The objective lens 20, embodying the present invention, is now explained in detail.

Figure 5:
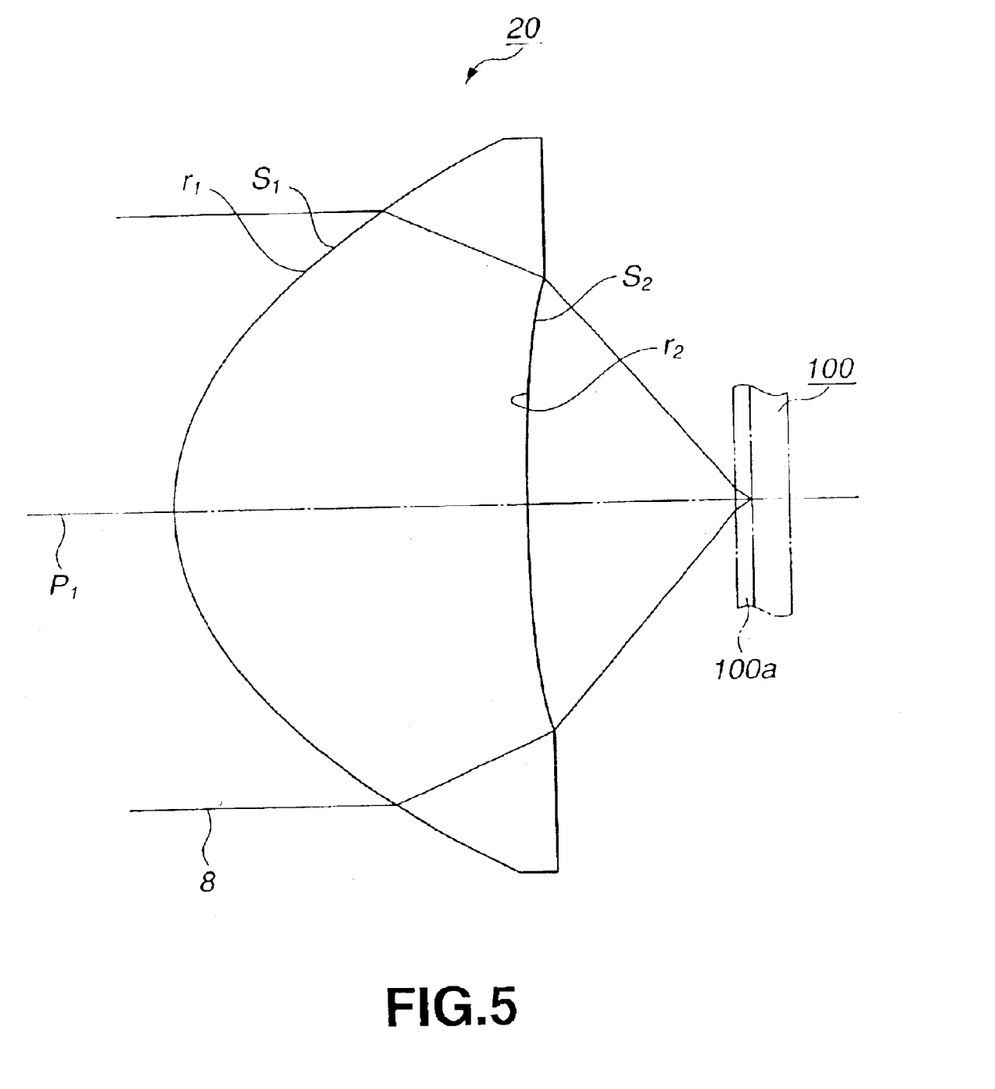
FIG. 5 is a longitudinal cross-sectional view showing an objective lens according to the present invention.

Referring to FIG. 5, the objective lens 20 according to the present invention is formed by a single lens of a meniscus structure comprised of a first surface $S_1$ and a second surface $S_2$, looking sequentially along the optical axis. The first surface $S_1$ has a positive refractive power and is formed by an aspherical surface, while the second surface $S_2$ has a negative refractive power and formed by an aspherical surface.

For irradiating the laser light beam on an optical disc, reduced in track pitch to improve the information recording density, for recording and/or reproducing the information signals, it is necessary to form a beam spot, smaller in diameter than for an optical disc with a larger track pitch, on the recording surface of the optical disc.

Since the spot diameter of the laser light, converged by the objective lens, is proportionate to the design wavelength of the laser light and inversely proportionate to the numerical aperture (NA) of the objective lens, it is necessary to increase the numerical aperture of the objective lens and to diminish the wavelength of the laser light if the diameter of the beam spot irradiated on the optical disc is to be reduced. As a technique for elevating the numerical aperture of the objective lens, a double type lens, typified by SIL, has already been proposed, as described above. This type of the objective lens is comprised of two lenses combined together, and is extremely difficult to manufacture with high assembling accuracy. Moreover, it is not possible to provide a sufficient working distance. The objective lens of the present invention is comprised of a single lens, and may be produced by machining with a metal die device for molding, thus eliminating the process of putting together plural lenses while achieving a large WD.

The objective lens 20 of the present invention, proposed to satisfy the above-mentioned requirements, is formed by a single lens of a meniscus structure, and is made up by the first surface $S_1$, having the positive refractive power and formed by an aspherical surface, and the second surface $S_2$, having the negative refractive power and formed by an aspherical surface, when looking from the light source side, as shown in FIGS. 4 and 5.

In the following explanation, $r_i$ means the radius of curvature of an ith surface Si as counted from the laser light radiating device 17.

For giving the definition of the aspherical surface, a sag Z of each surface $S_i$ of the objective lens 20 is expressed, with the height h from the optical axis $P_1$ as a parameter, by the following equation (1):

$$Z_i = \frac{r_i^{-1} h^2}{1 + \sqrt{1 - (1+k_i)r_i^{-2}h^2}} + A_i h^4 + B_i h^6 + $$
$$C_i h^8 + D_i h^{10} + E_i h^{12} + F_i h^{14} + G_i h^{16} + H_i h^{18} + J_i h^{20} \qquad (1)$$

where i is the surface number, that is the ith surface as counted from the light source side, $r_i$ is the radius of curvature of the ith surface $S_i$, k is the cone constant and $A_i$ to $J_i$ denote the degree four to degree twenty aspherical coefficients of the ith surface $S_i$.

With the radius of curvature $r_1$ of the first surface $S_1$, the focal length f and the numerical aperture NA, the objective lens 20 is arranged to satisfy the following equation (2):

$$r_1 < f \cdot NA \qquad (2).$$

Moreover, with the radius of curvature of the first surface $S_1$, the radius of curvature $r_2$ of the second surface $S_2$ and with the refractive index N of the vitreous material, the objective lens 20 is formed to satisfy the condition shown by the following equation (3):

$$(r_1/r_2) \leq (2N^2-N-4)/\{N(2N+1)\} \quad (3).$$

The conditions specified by the above equations (2) and (3) are those which allow to minimize the spherical aberration under suppression of the value of the aspherical coefficient to as small a value as possible.

That is, the condition of the equation (2) is necessary in order to set the on-axis wavefront aberration to the diffraction limit, for NA>0.8, while the condition of the equation (3) is necessary in order to distribute the weight among the respective coefficients, using up to the term of the 20th power of the light beam height of the aspherical coefficient in the definition equation for the aspherical surface (1), to minimize the magnitude of the aspherical coefficients in their entirety.

The objective lens 20 of the present invention, designed to have the numerical aperture NA not less than 0.8 or higher, is formed of a vitreous material having the refractive index of not less than 1.7. With the higher refractive index, it becomes possible to increase the radius of curvature of the objective lens 20 to suppress the spherical aberration.

Figure 6:
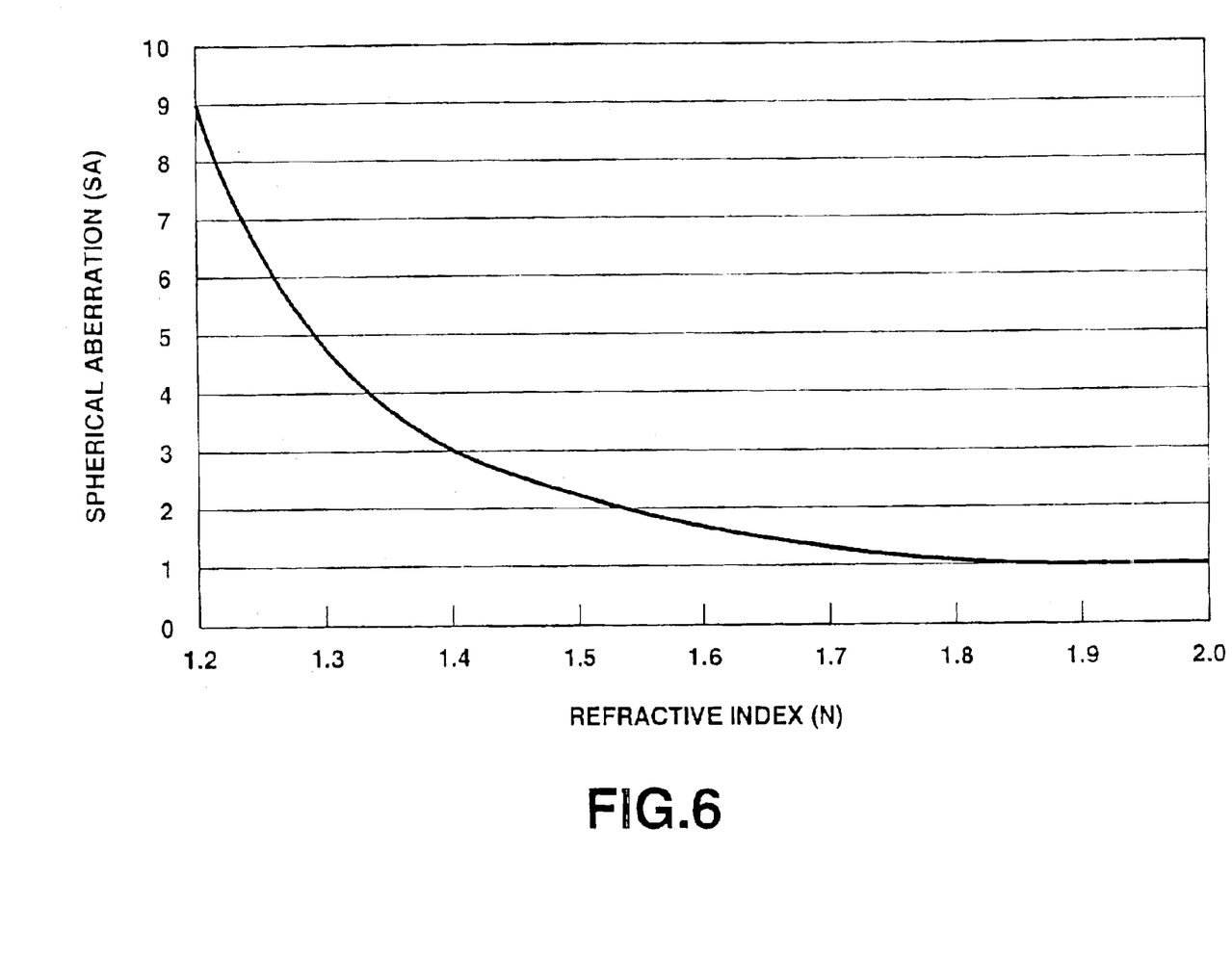
FIG. 6 is a graph showing the relation between the spherical aberration and the refractive index of the vitreous material.
Figure 7:
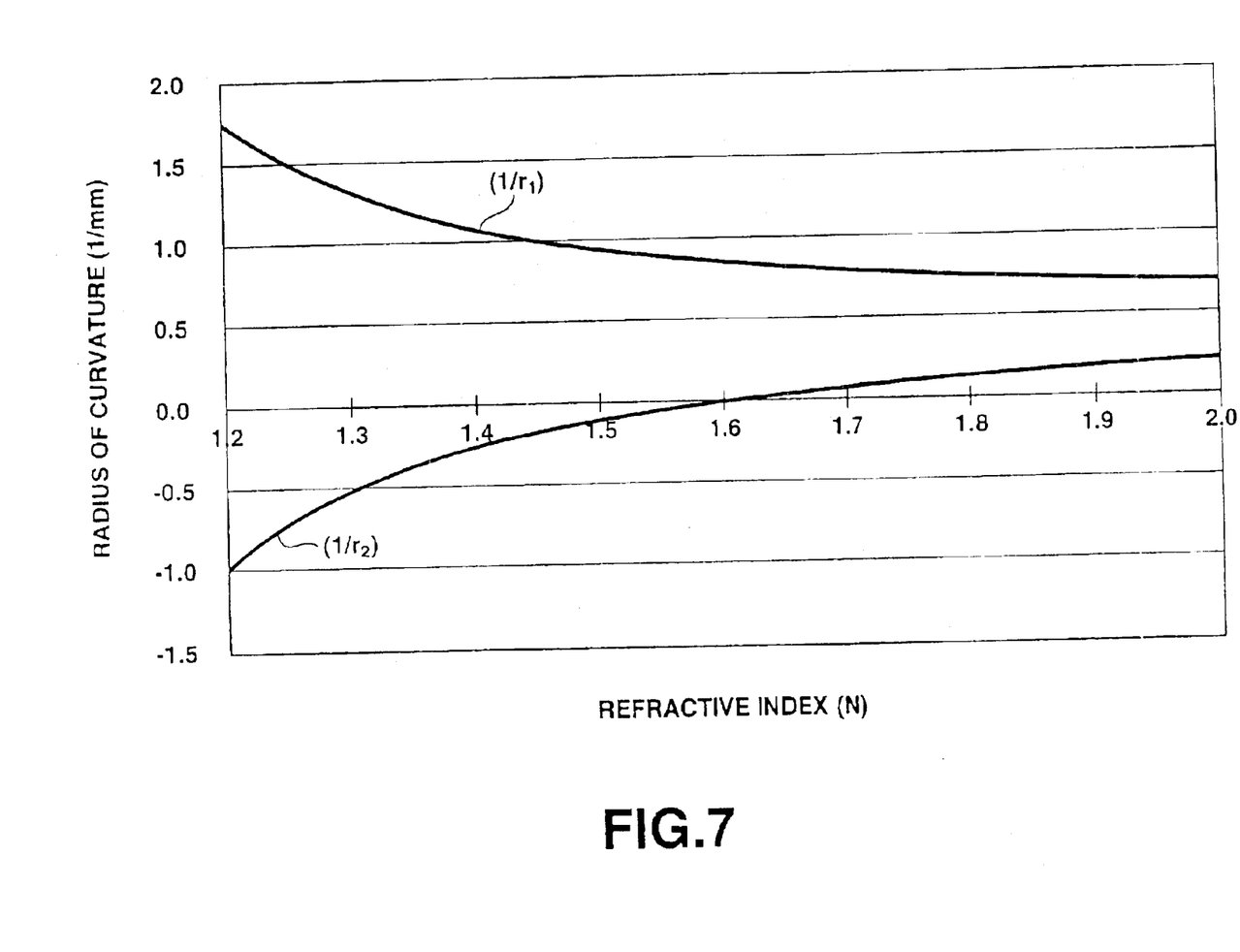
FIG. 7 is a graph showing the relation between the radii of curvature of the first and second surfaces of the objective lens and the refractive index of the vitreous material.
Figure 8:
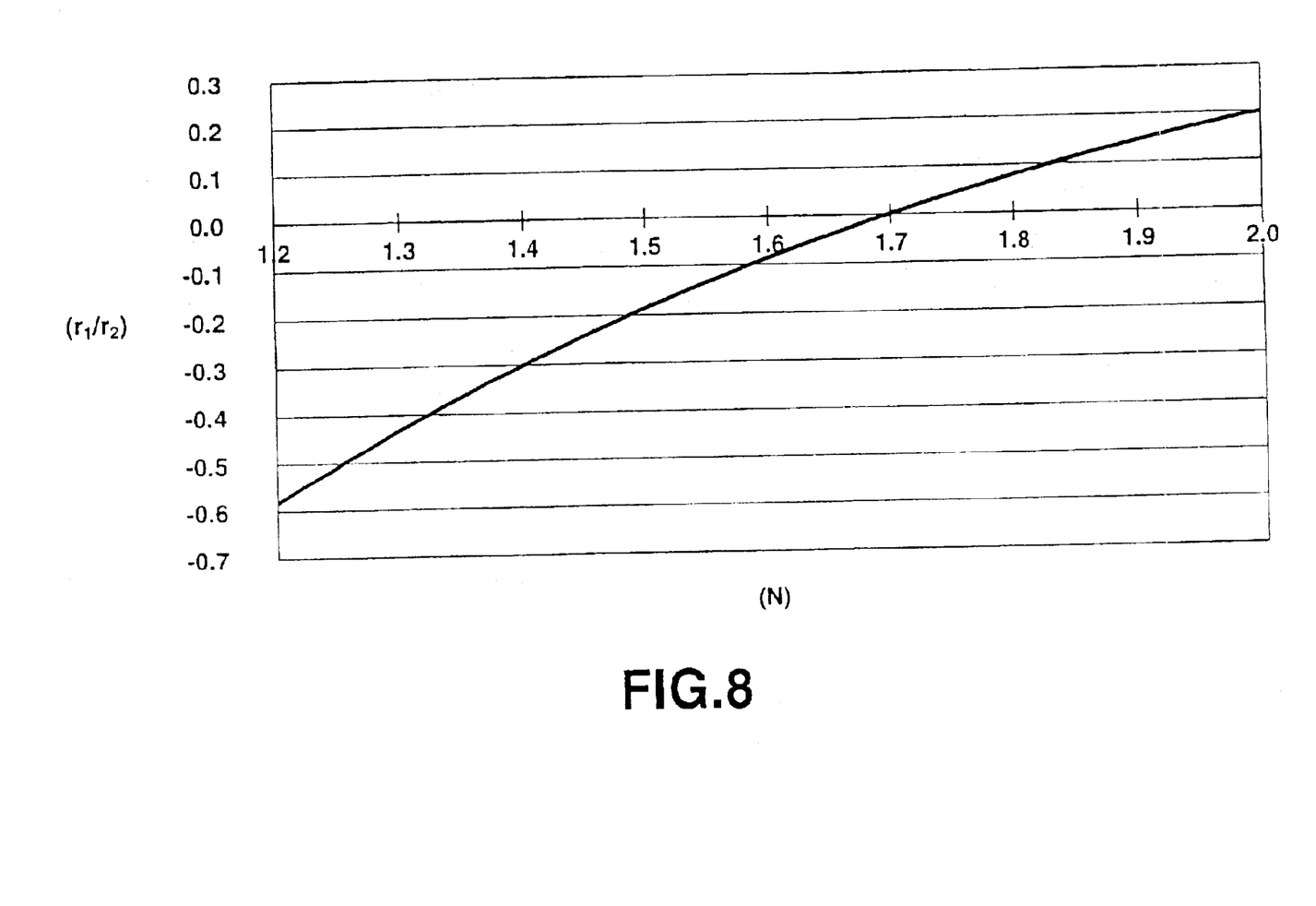
FIG. 8 is a graph showing the relation between the ratio of radii of curvature of the first and second surfaces of the objective lens and the refractive index of the vitreous material.

FIG. 6 is a graph showing the relationship between the minimum value of the spherical aberration SA, theoretically produced in a lens formed solely by a spherical surface, and the refractive index of the vitreous material. FIGS. 7 and 8 are graphs showing the relationship between the radius of curvature $r_1$ of the first surface $S_1$ and the radius of curvature $r_2$ of the first surface $S_2$ which will minimize the spherical aberration.

Thus, it is seen from FIG. 6 that the larger the refractive index N, the smaller may be the spherical aberration, while it is also seen from FIG. 7 that the larger the refractive index N, the smaller becomes the radius of curvature $r_1$ of the first surface $S_1$. It may be seen from FIGS. 6 and 7 that, with the refractive index N>1.7, the minimum value of the spherical aberration is substantially converged, while the fundamental radius of curvature $r_1$ of the first surface $S_1$ is approximately constant. Under this condition, as shown in FIG. 8, the radius of curvature $r_2$ of the second surface $S_2$ is also positive to provide a lens of a so-called meniscus structure.

Meanwhile, with the objective lens 20 of the present invention, the numerical aperture (NA) is high, so that the aspherical coefficient is the higher degree function of the height from the optical axis. Additionally, under the above-mentioned conditions, the sag of the first surface $S_1$ is of a large magnitude, amounting to 0.8 mm to 1 mm in the vicinity of the effective diameter. In the second surface $S_2$, the effective diameter is on the order of one-third the outside diameter of the lens. Consequently, the metal die device for molding the objective lens 20 cannot be prepared unless the equation for defining the surface portion inside the effective diameter is differentiated from the equation for defining the surface portion outside the effective diameter for both the first surface $S_1$ and the second surface $S_2$.

With the objective lens 20 of the present invention, the surface portion of the lens outside the effective optical diameter is formed to the shape corresponding to that of the optical component described in Japanese Laying-Open Patent Publication 2000-249812 previously filed by the present Assignee, in order to assure molding with a metal die device even under the condition that the first and second surfaces $S_1$ and $S_2$ formed as aspherical surfaces are of the objective lens 20 according to the present invention are formed under the above-mentioned conditions. By forming the surface portion of the lens outside its effective optical diameter under the condition indicated in the above-mentioned Publication, it is possible to use the machining method for the metal die device for molding, with the use of the machining method for the metal die device for molding, as described in the above-mentioned Publication. As for this machining method for the metal die device for molding, reference is had to the relevant portion of the description of the Japanese Laying-Open Patent Publication 2000-249812 and a detailed description is omitted for simplicity.

Figure 9:
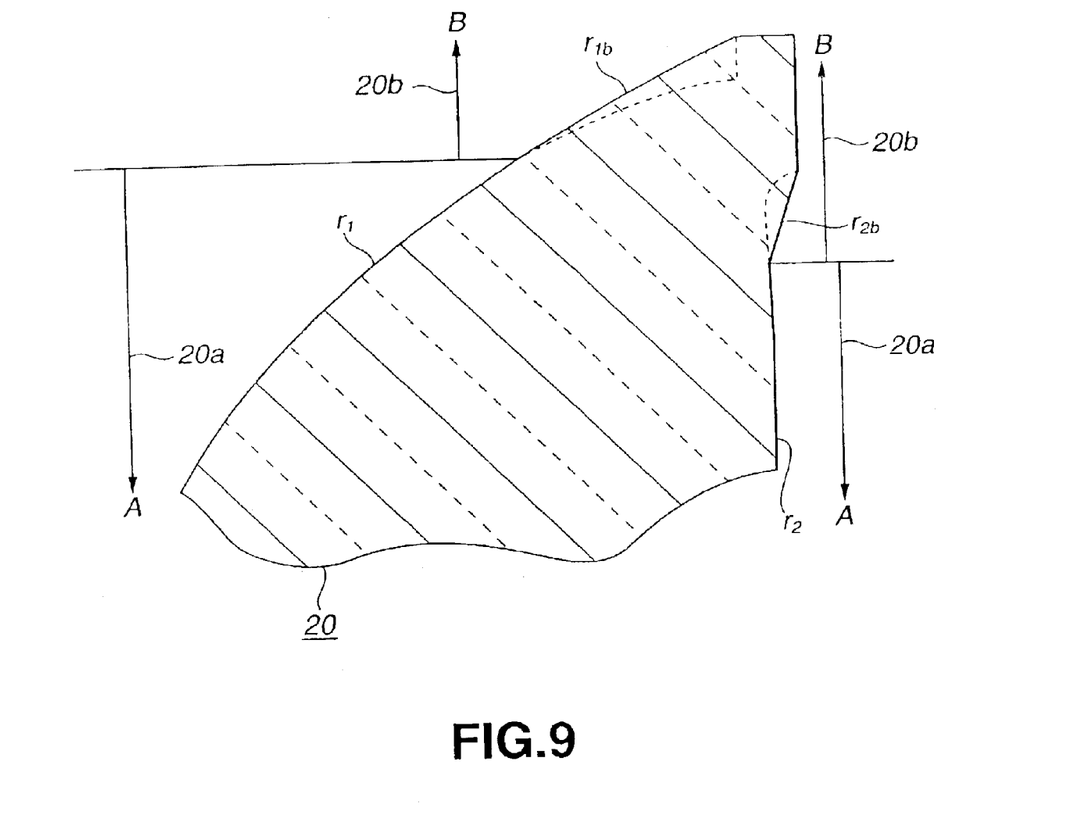
FIG. 9 is an enlarged cross-sectional view showing an instance of the shape of a surface portion outside the effective optical radius of the objective lens.

That is, as for the first surface $S_1$ and the second surface $S_2$ of the objective lens 20 of the present invention, there is formed an inner rim portion 20a, and an outer rim portion 20b, contiguous to the inner rim portion 20a, as shown schematically in FIG. 9. The inner rim portion 20a, lying within the optically effective area, as indicated by arrow A, is made up by a preset aspherical surface $r_1$, whilst the outer rim portion 20b, lying outside the optically effective area, as indicated by arrow B, is made up by an aspherical surface $r_{1b}$ smoother in the radius of curvature than the aspherical surface within the optically effective area.

That is, the first surface $S_1$ is not such a surface in which the entire curved surface thereof is formed in accordance with a preset equation for an aspherical surface, but is such a surface in which the inner rim portion 20a is formed by the aspherical surface $r_1$, whilst the outer rim portion 20b is formed by an aspherical surface $r_{1b}$ smoother in the radius of curvature than the aspherical surface, with a smooth junction between the inner rim portion 20a and the outer rim portion 20b. Preferably, the boundary zone between the inner rim portion 20a and the outer rim portion 20b represents a smooth transition area.

Similarly to the first surface $S_1$, the second surface $S_2$ is not such a surface in which the entire curved surface is formed in accordance with a preset equation for an aspherical surface, but is such a surface in which the inner rim portion 20a is formed by the aspherical surface $r_2$, whilst the outer rim portion 20b is formed by an aspherical surface rib smoother in the radius of curvature than the aspherical surface $r_2$, with a smooth junction between the inner rim portion 20a and the outer rim portion 20b. Preferably, the boundary zone between the inner rim portion 20a and the outer rim portion 20b represents a smooth transition area.

By forming the first surface $S_1$ and the second surface $S_2$ of the objective lens 20 as described above, it is possible to prevent an unmoldable portion from being produced at the time of molding employing the metal die device for molding to permit a molded product to be easily released from the metal die.

A specified design example of the objective lens 20 according to the present invention is now explained with reference to Examples 1 and 2.

The objective lens 20, corresponding to the Examples 1 and 2 of the present invention, respectively, is designed and arranged as shown in FIG. 5 described above.

The objective lens 20 of the Example 1 and that of Example 2 are formed of a vitreous material of a material quality corresponding to LAH53 (trade name) having a refractive index on the order of 1.8. The design value of the on-axis wavefront aberration of each of the objective lens 20 of Example 1 and that of Example 2 is 0.002 rms.

When the objective lens 20 of the present invention is mounted to the optical pickup, and this optical pickup is built into an optical disc device to enable information recording and/or reproduction for the optical disc 100, a protective layer 100a, provided on a laser light incident surface of the optical disc 100, is located between the objective lens 20 and the signal recording layer of the optical disc 100 operating as the laser light image forming surface. This protective layer 100a, provided on the optical disc 100, is formed overlying the signal recording layer provided on the optical disc 100, to protect the signal recording layer. The protective layer 100a is formed by coating a UV ray curable resin on a surface of the optical disc 100, including the signal recording layer, and by irradiating UV rays thereon to cure the resin, or by bonding a sheet of acrylic resin on the signal recording surface.

The values of the radius of curvature and the degree four to degree twenty aspherical coefficients A to J of the first and second surfaces $S_1$ and $S_2$ of the objective lens 20 of the first embodiment as shown in the following Table 1:

TABLE 1

|   | $S_1$ | $S_2$ |
|---|---|---|
| ri | 1.73226 | 34.17572 |
| k | −1.34255 | −367.1533 |
| A | 1.9992E−0.2 | 2.4360E−04 |
| B | 9.2511E−04 | −2.3770E−03 |
| C | −5.8671E−04 | 1.9795E−03 |
| D | 2.1415E−04 | −7.9236E−04 |
| E | −4.9627E−05 | 1.3427E−04 |
| F | −3.5541E−06 | −8.2123E−07 |
| G | 1.3662E−07 | −1.2283E−07 |
| H | −7.3660E−10 | −3.4123E−07 |
| J | −1.0877E−09 | −2.4693E−08 |

The values of the radius of curvature and the degree four to degree twenty aspherical coefficients A to J of the first and second surfaces $S_1$ and $S_2$ of the objective lens 20 of the second embodiment of the invention are shown in the following Table 2:

TABLE 2

|   | $S_1$ | $S_2$ |
|---|---|---|
| ri | 1.46867 | 79.82815 |
| k | −0.7949 | 6539.909 |
| A | 1.3419E−02 | 9.2304E−03 |
| B | 1.1966E−03 | −9.7019E−03 |
| C | 4.2220E−05 | −3.4465E−03 |
| D | −7.6906E−05 | −2.0214E−03 |
| E | −2.2611E−05 | 8.6477E−04 |
| F | −9.0727E−06 | 3.1034E−03 |
| G | −4.0424E−06 | 3.5934E−03 |
| H | −5.7415E−07 | 4.9101E−04 |
| J | 5.5544E−07 | −6.4353E−03 |

The wavelength of the laser light beam 18 of the laser light radiating device 17 of Examples 1 and 2, focal length f and the numerical aperture NA of the objective lens 20, thickness of the protective layer 100a as a cover layer of the optical disc 100, working distance WD, the refractive index N of the vitreous material of the objective lens 20 and the numerical values of the equations (2) and (3), according to the present invention, are shown in the following Table 3:

TABLE 3

|   | Ex. 1 | Ex. 2 |
|---|---|---|
| λ (nm) | 650 | 405 |
| f (mm) | 2.23 | 1.765 |
| NA | 0.85 | 0.85 |
| disc cover thickness (mm) | 0.1 | 0.1 |
| WD (mm) | 1.02 | 0.77 |
| N | 1.8007 | 1.8406 |

TABLE 3-continued

|   | Ex. 1 | Ex. 2 |
|---|---|---|
| $\frac{r1}{r2}$ | 0.0507 | 0.0184 |
| $\frac{2N^2-N-4}{N(2N+1)}$ | 0.0826 | 0.1085 |
| F · NA | 1.8955 | 1.50025 |

Figure 10A:
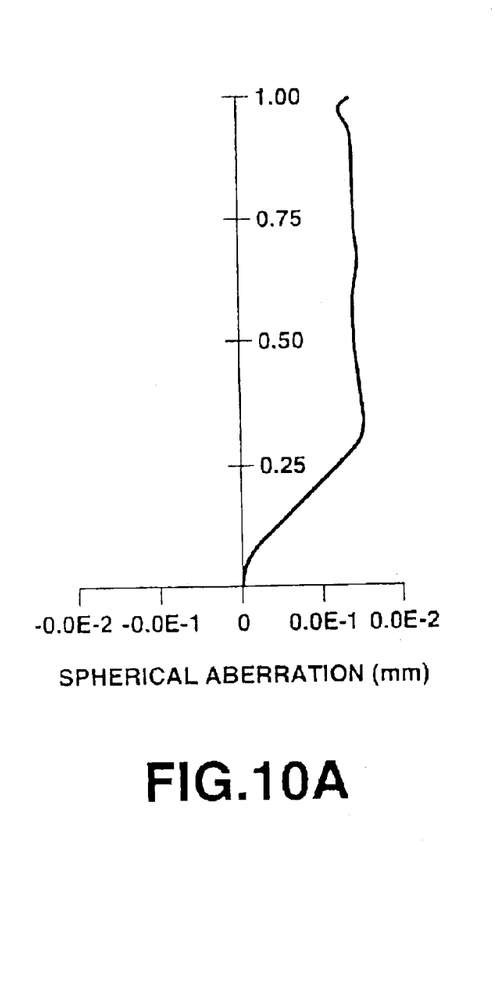
FIGS. 10A, 10B and 10C show spherical aberration, astigmatic aberration and distortion aberration of an objective lens according to a first embodiment of the present invention, respectively.
Figure 10B:
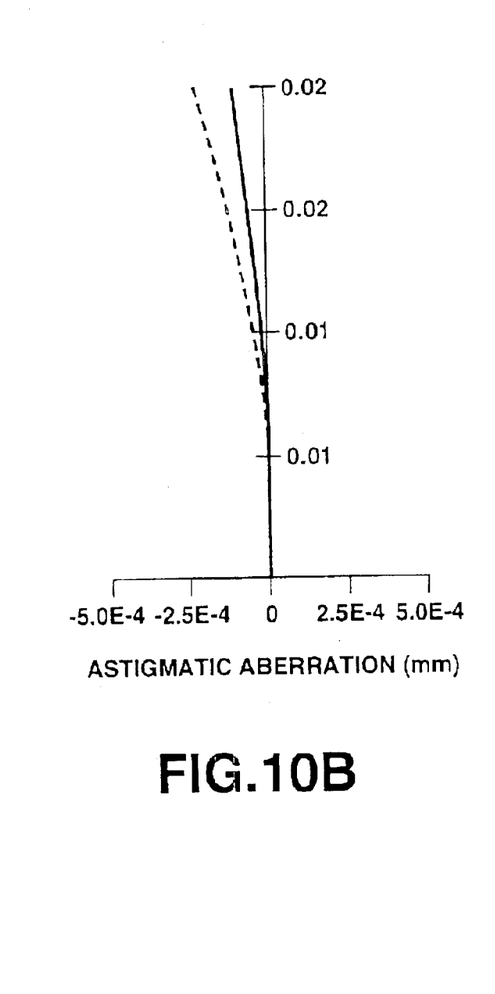
Figure 10C:
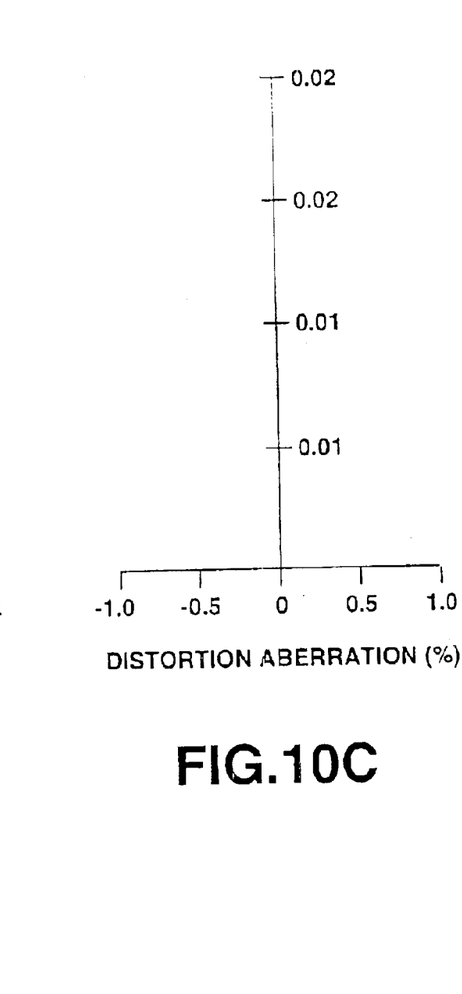
Figure 11A:
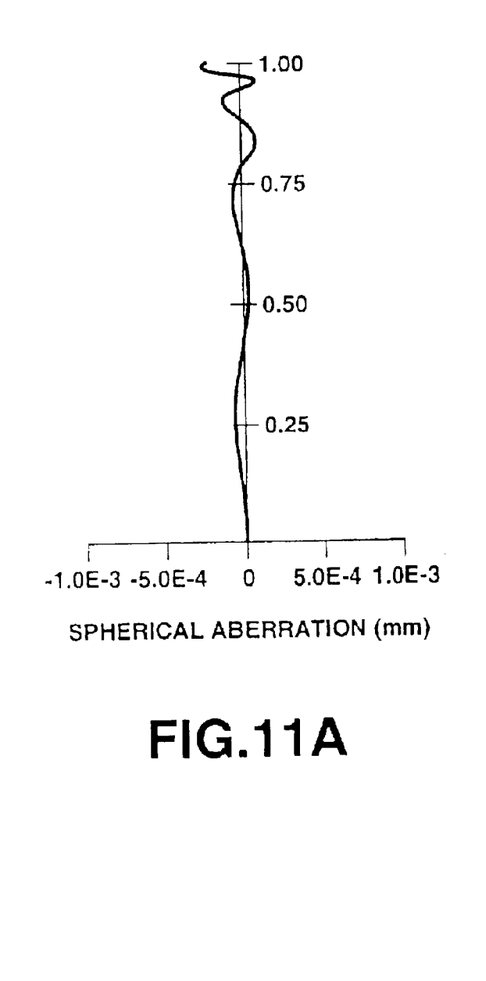
FIGS. 11A, 11B and 11C show spherical aberration, astigmatic aberration and distortion aberration of an objective lens according to a second embodiment of the present invention, respectively.
Figure 11B:
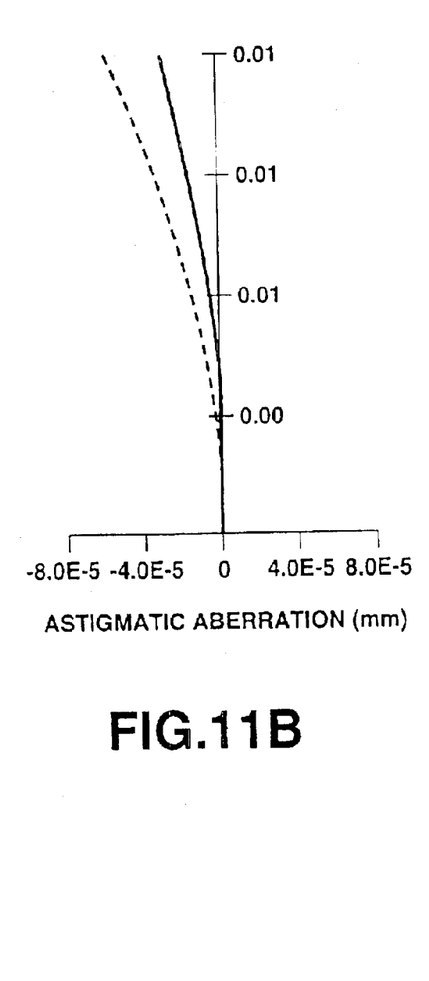
Figure 11C:
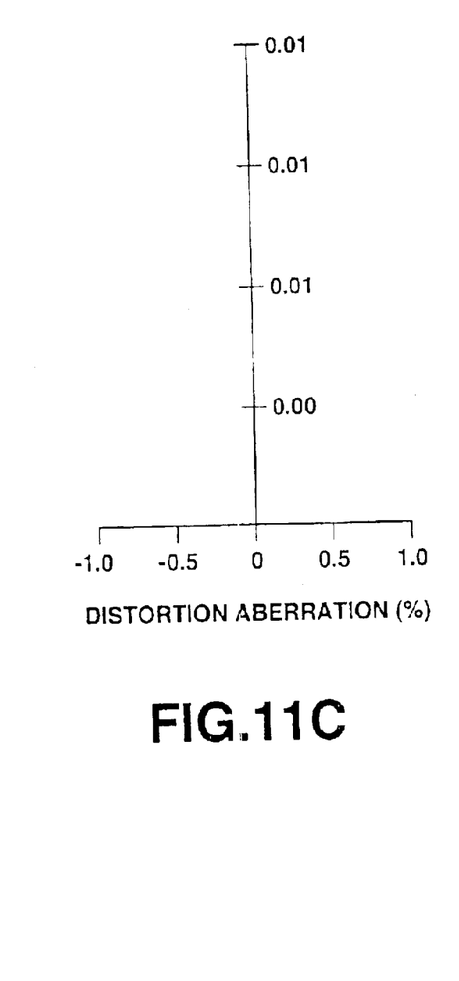

The spherical aberration, distortion aberration and the astigmatic aberration of the objective lens 200 of the Example 1 of the present invention are shown in FIGS. 10A to 10C. The spherical aberration, distortion aberration and the astigmatic aberration of the Example 2 of the present invention are shown in FIGS. 11A to 11C. As may be seen from the graphs of FIGS. 10A to 10C and FIGS. 11A to 11C showing the spherical aberration, distortion aberration and the astigmatic aberration, these aberrations are corrected, such that, with the objective lens of the present invention, the incident laser light can be converged to the limit of diffraction.

According to the present invention, as described above, the objective lens with the numerical aperture NA not less than 0.8 may be produced in a single lens configuration. With the objective lens 20 of the present invention, a working distance WD not less than 0.5 mm can be obtained for a thickness of the disc cover of 0.1 mm, that is the thickness of the protective layer 100a, that can be provided to the optical disc 100, so that, when the objective lens is mounted to the optical pickup and assembled in this state to the optical disc device, it is possible to prevent the objective lens 20 from being contacted with the optical disc 100.

Moreover, with the objective lens 20 according to the present invention, up to the term of the twentieth power of the light ray height of the aspherical coefficients of the first and second surfaces $S_1$ and $S_2$, formed as aspherical surfaces, are used to distribute the weights among the respective coefficients to reduce the size of the aspherical coefficients in their entirety to a minimum.

Additionally, the first and second surfaces $S_1$ and $S_2$, formed as aspherical surfaces, are each made up by an inner rim portion, including an area within an optically effective area formed by an aspherical surface, and an outer rim portion, consecutive to the inner rim portion and including an area outside the optically effective area formed by another aspherical surface smoother in radius of curvature than the aspherical surface of the inner rim portion, so that the lens can be molded using a metal die device for molding, even if the lens exhibits significant sag.

The present invention is not limited to the above-described specific embodiments and may be suitably modified without changing its purport.

Industrial Applicability

With the objective lens of the present invention, a high numerical aperture (NA) guaranteed, using a single type lens, to converge the laser light, radiated from a light source and converged on an optical recording medium, to near the limit of diffraction. With the optical pickup and the optical disc device, employing this objective lens, the information can be recorded and/or reproduced with optimum recording and/or reproducing characteristics for an optical recording medium in which the track pitch of the recording track is narrowed to increase the recording density.

What is claimed is:

1. An objective lens for an optical pickup, made up by a single lens of a meniscus structure including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_i h^4 + B_i h^6 + C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients; and wherein
the following condition:

$$(r_1/r_2) \leq (2N^2-N-4)/\{N(2N+1)\}$$

is also met, where $r_1$ is the radius of curvature of the first surface, $r_2$ is the radius of curvature of the second surface and N is a refractive index of the vitreous material.

2. The objective lens for an optical pickup as recited in claim 1 wherein the following condition:

$$r_1 < f \cdot NA$$

is met, where $r_1$ is the radius of curvature of the first surface, f is the focal length and the NA is the numerical aperture.

3. The objective lens for an optical pickup as recited in claim 1 wherein the refractive index of the vitreous material is not less than 1.7.

4. An objective lens for an optical pickup, made up by a single lens of a meniscus structure including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_i h^4 + B_i h^6 + C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients; and wherein
the following condition:

$$r_1 < f \cdot NA$$

is met, where $r_1$ is the radius of curvature of the first surface, f is the focal length and the NA is the numerical aperture.

5. The objective lens for an optical pickup as recited in claim 4 wherein the refractive index of the vitreous material is not less than 1.7.

6. An optical pickup comprising a light source radiating a laser light beam, a beam splitter, an objective lens for converging the laser light on a signal recording surface of a disc-shaped recording medium, and a light receiving element for receiving the laser light reflected back from the signal recording surface of the disc-shaped recording medium;

said objective lens including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_i h^4 + B_i h^6 + C_i h^8 + D_i h^{10} + E_i h^{12} + F_i h^{14} + G_i h^{16} + H_i h^{18} + J_i h^{20}$$

with the height from the optical axis being h, where i is the surface number, as counted from the light source side, r is the radius of curvature of the aspherical surface, k is the cone constant, with k<0, and A to J denote aspherical coefficients; and wherein
the following condition:

$$(r_1/r_2) \leq (2N^2-N-4)/\{N(2N+1)\}$$

is also met, where $r_1$ is the radius of curvature of the first surface, $r_2$ is the radius of curvature of the second surface and N is a refractive index of the vitreous material.

7. The objective pickup as recited in claim 6 wherein the following condition:

$$r_1 < f \cdot NA$$

is also met, where $r_1$ is the radius of curvature of the first surface, f is the focal length and the NA is the numerical aperture.

8. An optical pickup comprising a light source radiating a laser light beam, a beam splitter, an objective lens for converging the laser light on a signal recording surface of a disc-shaped recording medium, and a light receiving element for receiving the laser light reflected back from the signal recording surface of the disc-shaped recording medium;

said objective lens including, looking sequentially from a light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_ih^4 + B_ih^6 +$$
$$C_ih^8 + D_ih^{10} + E_ih^{12} + F_ih^{14} + G_ih^{16} + H_ih^{18} + J_ih^{20}$$

with the height from the optical axis being h, where i is the surface number, as counted from the light source side, r is the radius of curvature of the aspherical surface, k is the cone constant, with k<0, and A to J denote aspherical coefficients; and wherein the following condition:

$$r_1 < f \cdot NA$$

is also met, where $r_1$ is the radius of curvature of the first surface, f is the focal length and the NA is the numerical aperture.

9. An optical disc apparatus comprising a rotational driving mechanism for rotationally driving a disc-shaped optical recording medium, and an optical pickup movable along the radius of said disc-shaped optical recording medium, run in rotation by said rotational driving mechanism, and adapted for scanning a signal recording area of said disc-shaped optical recording medium by laser light radiated from a light source to record and/or reproduce the information, wherein said optical pickup includes a light source radiating a laser light beam, a beam splitter, an objective lens for converging the laser light on a signal recording surface of a disc-shaped recording medium, and a light receiving element for receiving the laser light reflected back from the signal recording surface of the disc-shaped recording medium; and wherein said objective lens includes, looking sequentially from the light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_ih^4 + B_ih^6 +$$
$$C_ih^8 + D_ih^{10} + E_ih^{12} + F_ih^{14} + G_ih^{16} + H_ih^{18} + J_ih^{20}$$

with the height from the optical axis being h, where i is the surface number, as counted from the light source side, r is the radius of curvature of the aspherical surface, k is the cone constant, with k<0, and A to J denote aspherical coefficients; and wherein the following condition:

$$(r_1/r_2) \leq (2N^2-N-4)/\{N(2N+1)\}$$

is met, where $r_1$ is the radius of curvature of the first surface, $r_2$ is the radius of curvature of the second surface and N is a refractive index of the vitreous material.

10. The optical disc apparatus as recited in claim 9 wherein the following condition:

$$r_1 < f \cdot NA$$

is met, where $r_1$ is the radius of curvature of the first surface, f is the focal length and the NA is the numerical aperture.

11. An optical disc apparatus comprising a rotational driving mechanism for rotationally driving a disc-shaped optical recording medium, and an optical pickup movable along the radius of said disc-shaped optical recording medium, run in rotation by said rotational driving mechanism, and adapted for scanning a signal recording area of said disc-shaped optical recording medium by laser light radiated from a light source to record and/or reproduce the information, wherein said optical pickup includes a light source radiating a laser light beam, a beam splitter, an objective lens for converging the laser light on a signal recording surface of the disc-shaped recording medium, and a light receiving element for receiving the laser light reflected back from the signal recording surface of the disc-shaped recording medium; and wherein said objective lens includes, looking sequentially from the light source side, a first surface formed by an aspherical surface, having a positive refractive power, and a second surface, formed by an aspherical surface, having a negative refractive power, with the numerical aperture (NA) of the lens being not less than 0.8, wherein the aspherical shape $Z_i$ of said aspherical surfaces of said first and second surfaces is given by the equation:

$$Z_i = \frac{r_i^{-1}h^2}{1+\sqrt{1-(1+k_i)r_i^{-2}h^2}} + A_ih^4 + B_ih^6 +$$
$$C_ih^8 + D_ih^{10} + E_ih^{12} + F_ih^{14} + G_ih^{16} + H_ih^{18} + J_ih^{20}$$

with the height from the optical axis being h, where i is the surface number, as counted from the light source side, r is the radius of curvature of the aspherical surface, k is the cone constant, with k<0, and A to J denote aspherical coefficients; and wherein the following condition:

$$r_1 < f \cdot NA$$

is met, where $r_1$ is the radius of curvature of the first surface, f is the focal length and the NA is the numerical aperture.

* * * * *